United States Patent [19]

Funck et al.

[11] 4,063,063
[45] Dec. 13, 1977

[54] METHOD OF DESCALING METAL PRODUCTS

[75] Inventors: Alfred Funck; Jo Simon, both of Esch, Alzette, Luxembourg

[73] Assignee: Acieries Reunies de Burbach-Eich-Dudelange S.A. ARBED, Luxembourg, Luxembourg

[21] Appl. No.: 658,107

[22] Filed: Feb. 13, 1976

[30] Foreign Application Priority Data

Feb. 14, 1975 Luxembourg .................... 71852

[51] Int. Cl.² ............................................. B23K 26/00
[52] U.S. Cl. ............................... 219/121 LM; 266/51; 148/9.5; 427/299; 29/81 H; 29/DIG. 24
[58] Field of Search .................... 219/121 L, 121 LM; 15/77, 102; 29/81, DIG. 24; 427/299, 307, 328; 148/9.5; 266/51

[56] References Cited

U.S. PATENT DOCUMENTS

| 1,436,464 | 11/1922 | Sundh | 15/77 |
| 2,359,008 | 9/1944 | Groft | 15/4 X |
| 3,305,666 | 2/1967 | Zaromb | 219/121 LM |
| 3,632,398 | 1/1972 | Konig | 219/121 LM X |

FOREIGN PATENT DOCUMENTS

| 1,284,575 | 1968 | Germany | 266/51 |
| 365,686 | 1/1963 | Switzerland | 219/121 P |
| 1,127,715 | 9/1968 | United Kingdom | 219/121 LM |
| 1,153,282 | 5/1969 | United Kingdom | 219/121 L |
| 407,103 | 3/1934 | United Kingdom | 15/77 |

OTHER PUBLICATIONS

"Energy Beams as Working Tools" by C. Q. Lemmond, L. H. Stauffer, July 20, 1964.

*Primary Examiner*—J. V. Truhe
*Assistant Examiner*—Mark H. Paschall
*Attorney, Agent, or Firm*—Karl F. Ross

[57] ABSTRACT

Metallic sheets, wires, bars or other products are descaled by sweeping their surfaces with one or more laser beams to detach an adhering oxide film along lines traced by the beam sweep. The film fragments, still loosely adhering at locations between the sweep lines, are then removed mechanically, chemically or electrolytically.

6 Claims, 1 Drawing Figure

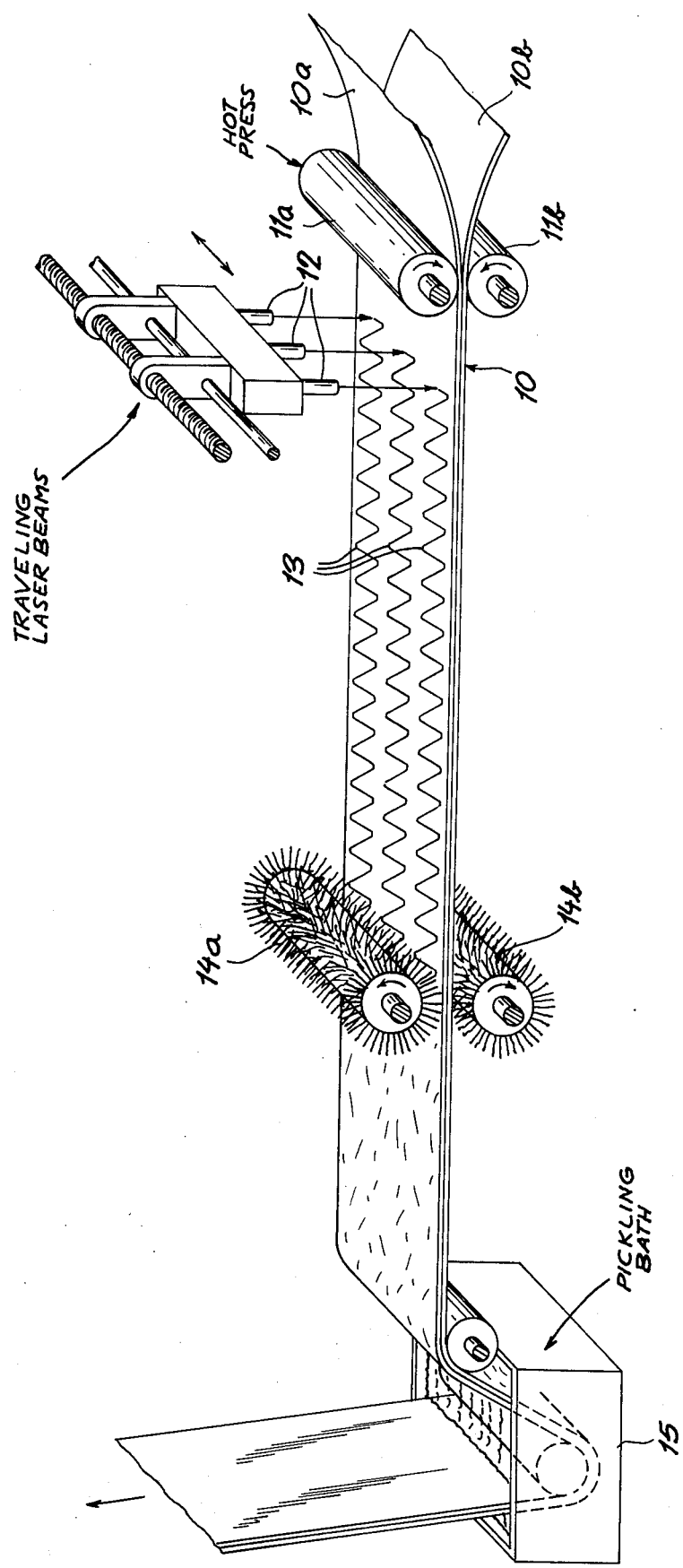

METHOD OF DESCALING METAL PRODUCTS

FIELD OF THE INVENTION

Our present invention relates to a method of descaling metal products such as sheets, wires, bars and the like.

BACKGROUND OF THE INVENTION

The removal of oxide films from the surface of such metallic workpieces can be carried out in various ways, i.e. mechanically, chemically or electrolytically. Mechanical removal, e.g. by scraping, requires considerable force and may result in undesirable surface changes. Chemical or electrolyical cleansing necessitates prolonged immersion in a pickling solution, which may objectionably delay the handling of the articles on a mass-production basis. Combined mechanical and chemical treatments, with physical deformation of the article followed by immersion in a bath, also may result in undesirable structural modifications.

OBJECT OF THE INVENTION

The object of our present invention, therefore, is to provide an improved and accelerated method of descaling metallic workpieces having surfaces coated with an oxide film.

SUMMARY OF THE INVENTION

This object is realized, pursuant to our invention, by subjecting the oxide film to sudden localized heating from one or more laser beams sweeping the coated workpiece surface, thereby detaching the film from the subjacent metallic substrate along the path of the sweep.

We have found that it is not necessary to subject the entire film to a laser sweep but that it is sufficient to let the beam or beams criss-cross the coated surface in a multiplicity of closely spaced yet discrete passes. Even in the area between the passes the film will be sufficiently loosened to be readily separated from its substrate by a conventional aftertreatment, such as scraping, tumbling or pickling, involving the entire surface.

The intensity of each laser beam and the rate of its sweep should be so chosen that the film struck by the beam is abruptly heated to a temperature on the order of at least 1000° C. The beam power, e.g. in the case of a $CO_2$ laser, may range between about 100 watts and 10 kilowatts, depending on distance and scanning speed. The distance of the laser source from the workpiece surface may vary between 1 mm and 10 cm, for example, with speeds ranging between 1 and 10 meters per minute. The beam diameter at the point of impact may lie between about 0.2 mm and 1 mm, with the spacing of the passes preferably equaling about 5 to 25 times that diameter.

In the case of an elongate workpiece such as a strip, rod or wire moving continuously past the treatment station, the path traced by the laser beam on the workpiece surface may be parallel, perpendicular or oblique to the direction of motion. In order to prevent local overheating, however, care should be taken to keep the relative beam speed as constant as possible throughout the sweep.

The descaled workpiece, after final cleansing by a conventional oxide-removing aftertreatment of the entire laser-treated surface, can be subjected to further processing by plating, drawing, hot or cold lamination, and so forth.

The various parameters determining the effectiveness of the laser sweep insure a thorough removal of the oxide film by the subsequent aftertreatment with substantially less energy and in shorter time than would otherwise be necessary, without leaving objectionable traces on the workpiece surface. In the case of ferrous metals, for example, little surface roughness and practically no formation of martensite or bainite is found to occur under conditions such as those specified hereinafter.

BRIEF DESCRIPTION OF THE DRAWING

The above and other features of our invention will now be described in detail with reference to the accompanying drawing the sole FIGURE of which shows, schematically, an installation for carrying out our improved descaling method.

SPECIFIC DESCRIPTION

In the drawing we have shown a workpiece 10 to be descaled, specifically a laminated steel sheet in the shape of an elongated strip formed from two foils 10a, 10b by hot-pressing between rollers 11a, 11b. A group of $CO_2$ lasers 12 are trained upon the upper sheet surface (there being another such group, not illustrated, for the lower surface) and are reciprocated to sweep respective zones of that surface along zig-zag lines 13 for the purpose of loosening an oxide film formed thereon as a result of the hot-pressing step. The sheet is then passed between two rotating wire brushes 14a, 14b scraping the film fragments off its surface. A final aftertreatment takes place in a pickling bath 15.

EXAMPLE I

The beams 12 have a power of 350 w each and strike the sheet surface at a distance of 10 mm with a beam diameter of 0.5 mm. With a scanning rate of 1 meter per minute, the sheet is locally heated to about 5,000° C. The spacing of the traces 13 is ten times the beam diameter, or 5 mm, this corresponds to an advance of the sheet by ten beam diameters in the course of an oscillatory cycle of the laser source.

Even with a reduction of the beam power to 100 w and an increase in scanning speed to 10 meters per minute, the surface temperature at the point of impact will be at least 2,000° C.

When the effective beam intensity is increased, as by reducing the source distance to a fraction of a centimeter and/or slowing down the sweep rate, a white crust forms on the irradiated surface which can easily be removed by brushing. In fact, a second traverse of the treatment device 12 by the irradiated workpiece destroys this scaly crust without necessitating its mechanical removal.

If the intensity of the laser beams become excessive, however, transformation of austenite to martensite and/or bainite may take place and surface roughness may become objectionable.

EXAMPLE II

The procedure of Example I is modified by raising the scanning speed to 7 meters per minute and the beam power to 5 kw. The results of this accelerated treatment are similar to those described above.

Naturally, the mechanical and chemical or electrolytic aftertreatments shown in the drawing need not be employed together. Thus, with omission of the mechanical-scraping step, pickling of the workpiece irradiated according to Example I in a bath of sulfuric acid of 80° C results in complete descaling within 90 seconds, compared with an immersion time of 180 seconds required for the descaling of a nonirradiated workpiece of the same type.

We claim:

1. A method of descaling metallic workpieces having surfaces coated with an oxide film, comprising the steps of subjecting the oxide film of a workpiece to be descaled to sudden localized heating by continuously displacing at least one laser beam in a multiplicity of closely spaced but discrete passes across the coated surface, thereby detaching the film from the subjacent metallic substrate along the path of the beam sweep and substantially loosening the film between said discrete passes, and thereafter subjecting said coated surface in its entirety to an oxide-removing aftertreatment.

2. A method as defined in claim 1 wherein said aftertreatment comprises mechanical scrubbing.

3. A method as defined in claim 1 wherein said aftertreatment comprises immersion in a bath.

4. A method as defined in claim 1 wherein the film is locally heated by the laser beam to a temperature on the order of at least 1000° C.

5. A method as defined in claim 1 wherein the spacing of said passes lies between substantially 5 and 25 times the beam diameter at the point of impact.

6. A method as defined in claim 1 wherein said workpiece is an elongate strip, said discrete passes being produced by continuously advancing said strip past a laser source and oscillating the laser beam thereof over at least part of the width of the advancing strip, the advance of the strip in the course of an oscillatory cycle being substantially greater than the beam diameter.

* * * * *